United States Patent
Casey et al.

(10) Patent No.: US 8,160,892 B2
(45) Date of Patent: Apr. 17, 2012

(54) BORDER MANAGEMENT SOLUTION

(75) Inventors: Lynn Ann Casey, Vienna, VA (US);
Maurine T. Shields, Arlington, VA (US)

(73) Assignee: Accenture Global Services Limited, Dublin (IE)

( * ) Notice: Subject to any disclaimer, the term of this patent is extended or adjusted under 35 U.S.C. 154(b) by 2122 days.

(21) Appl. No.: 10/686,608

(22) Filed: Oct. 17, 2003

(65) Prior Publication Data
US 2004/0102991 A1    May 27, 2004

Related U.S. Application Data

(60) Provisional application No. 60/428,735, filed on Nov. 25, 2002.

(51) Int. Cl.
*G06Q 10/00*    (2012.01)
(52) U.S. Cl. .......................................... 705/1.1
(58) Field of Classification Search ........................ 705/1
See application file for complete search history.

(56) References Cited

U.S. PATENT DOCUMENTS

| | | | |
|---|---|---|---|
| 6,085,186 A * | 7/2000 | Christianson et al. ............ | 707/3 |
| 6,115,690 A * | 9/2000 | Wong ................................ | 705/7 |
| 2003/0115133 A1 * | 6/2003 | Bian ................................ | 705/38 |

OTHER PUBLICATIONS

Wade, Betsy. "Customs aims to keep their pledge; [Final Edition]". San Antonio Express-News. San Antonio, Tex.: Mar. 30, 1997, p. 3.K.*
Coalition for Secure & Trade-Efficient Borders. "Rethinking our Borders: A Plan for Action". Published Dec. 3, 2001 at www.cme-mec.ca/national/template_na.asp?p=104.*
Air Safety Week. "Hijacked Jetliners Used as Weapons of Mass Destruction". Air Safety Week. New York: Sep. 17, 2001. vol. 15, Iss. 35; p. 1.*
Wilson, Duff and James Neff. "Terrorists exploited their Saudi visa; U.S. has been lax in monitoring visitors, particularly from rich all; [Fourth Edition]". Seattle Times. Seattle, Wash.: Nov. 11, 2001. p. A.10.*
Sachs, Susan. "Changes Called Likely in Policy on Immigration". New York Times. (Late Edition (East Coast)). New York, N.Y.: Sep. 24, 2001. p. A.16.*
Kestin, Sally. "How did we miss enemies in our midst?; [Broward Metro Edition]." South Florida Sun-Sentinel. Fort Lauderdale, Fla.: Sep. 16, 2001. p. 1.A).*
Canada NewsWire. "Business Outlines Border Management and Security Recommendations". Canada NewsWire. Ottawa: Dec. 3, 2001. p. 1.*

(Continued)

*Primary Examiner* — Gabrielle McCormick
(74) *Attorney, Agent, or Firm* — Finnegan, Henderson, Farabow, Garrett & Dunner, LLP

(57) ABSTRACT

An integrated border management solution providing a balance between facilitating the movement of people and commerce with the requirements of immigration, customs, and other border-focused law enforcement. The facilitation aspect of the solution includes processing of arrivals and departures, as well as processing requests triggered by forms and applications such as requests for visas, asylum or customs declarations. The enforcement aspect of the solution includes border enforcement alerts and communication, as well as a comprehensive, integrated investigation and intelligence workbench. The border management solution is based upon a border management business architecture defining the structure for developing a border management solution in terms of its capabilities and the interrelationships of those capabilities. The border management solution according to the present invention may be implemented as an integrated whole or as component parts to a border management solution.

9 Claims, 14 Drawing Sheets

OTHER PUBLICATIONS

Gugliotta, Guy. "America Responds / Terrorist watch list no match for pair / Hijacking suspects eluded all controls; [3 STAR Edition]". Houston Chronicle. Houston, Tex.: Sep. 24, 2001. p. 1.*

Gugliotta, Guy. "American Responds / Terrorist watch list no match for pair / Hijacking suspects eluded all controls". Houston Chronicle. Houston, Tex.: Sep. 24, 2001. p. 1.*

* cited by examiner

BORDER MANAGEMENT SOLUTION

CROSS REFERENCE TO RELATED APPLICATIONS

This application claims benefit of U.S. Provisional Application No. 60/428,735 entitled "Border Management Solution" and filed Nov. 25, 2002, which is hereby incorporated by reference.

BACKGROUND OF THE INVENTION

1. Field of the Invention

The present invention relates to a border management solution, and more particularly, to a border management solution based on a business architecture that provides integrated support among various entities responsible for managing the security and laws of a country's borders.

2. Discussion of the Related Art

Border management has become an increasingly difficult function that faces significant and increasing challenges in protecting a country's citizens, infrastructure, and economy from threats at its borders, while at the same time supporting economic stability and growth through the facilitation of the passage of people and trade. The functions of border management have traditionally been managed by multiple disparate agencies or entities responsible for specific and at times overlapping elements of a border management solution.

The primary challenges faced by agencies or entities currently responsible for border management include the global effects of local immigration, travel, and trade trends; increasing workload, insufficient staff; the balance between facilitation and enforcement; barriers to coordinated border management; and eGovernment mandates and challenges.

The lack of coordination among these agencies or entities, or even the framework with which interaction is encouraged or developed, reduces the ability of the border management system to meet these challenges. Thus, a balance of facilitation and enforcement cannot be met with current border management systems.

Within a traditional boarder management system information collected by one entity is generally not shared with or even available to other entities. Without the interchange of information, each agency or entity houses a limited collection of knowledge collected by that border management entity alone. A lack of interchange of such information deprives the border management entities an opportunity to develop a complete view of a particular situation for assessing border management decisions. Furthermore, information gathering capabilities and technologies are further limited by the lack of a coherent data source.

These and other deficiencies exist in current border management solutions. Therefore, a solution to these problems is needed, providing an improved border management solution.

SUMMARY OF THE INVENTION

Accordingly, in view of these and other deficiencies inherent in current border management solutions, the present invention is directed to an integrated border management solution providing a balance between facilitating the movement of people and commerce with the requirements of immigration, customs, and other border-focused law enforcement. The facilitation aspect of the solution includes processing of arrivals and departures, as well as processing requests triggered by forms and applications such as requests for visas, asylum or customs declarations. The enforcement aspect of the solution includes border enforcement alerts and communication, as well as a comprehensive, integrated investigation and intelligence workbench. A border management solution according to the present invention may be implemented as an integrated whole or as component parts to a border management solution.

The present invention provides a border management business architecture defining the structure for developing a border management solution in terms of its capabilities and the interrelationships of those capabilities. Encompassed within the border management business architecture are the supporting process, application, technology, organization, competency, culture, communication, and collaboration architectures. A border management entity can use the border management business architecture to evaluate current capabilities and define the new capabilities and support structures required to provide effective border management and to transform an agency into a model organization.

The border management business architecture provides the flexibility to remain intact through subsequent changes in strategy, policy, performance requirements, organization, and other key factors that are a natural part of an evolving public sector environment.

The present invention provides an integrated border management solution combining four primary quadrants that identify key border management responsibilities and define how those performing these responsibilities work together either within one agency or across multiple agencies. Supporting elements of the border management solution also include customer channels, an integrated view of the customer, border management knowledge, and border enforcement intelligence.

One of the primary quadrants provides for the requests and applications of travelers and commerce shipments. This quadrant incorporates the processing of such items as visas, asylum requests, and customs declarations.

A second primary quadrant provides for the interaction with immigrants, travelers, and trade as they move through a country's borders. The arrival or departure of an individual, or the import or export of cargo may initiate actions taken within this quadrant. Records matching, and passenger or cargo identification are also managed within this quadrant.

A third primary quadrant provides for the detection and enforcement of immigration, customs, and other border-focused laws. Unusual entry or exit, or an overstay may trigger activity in this quadrant. Such activity may propagate efforts to identify or alert other to such behavior, or may initiate questioning of passengers or shippers.

A forth primary quadrant provides for investigation and intelligence development. Each instance requiring investigation allows for the analysis of previously collected information and also provides for the addition of information collected while the current investigation is ongoing.

Each of the primary quadrants provides for the collection, evaluation, and use of data throughout the border management process. Through this collection and sharing of information each entity working within the border management solution increases the knowledge base and provides for more efficient use of the collected data. By developing a central data source that is accessible through the border management knowledge element not only is the knowledge base enhanced for the entity or entities working within the four-quadrant solution, but intelligence, in addition to the collected data, may also be developed through an intelligence engine of the border enforcement intelligence element.

In one embodiment of the present invention, a border management business architecture for developing a border management solution is disclosed. The border management business architecture includes one or more citizen-facing capabilities providing interaction between people or commerce entering or exiting a country and border enforcement personnel; one or more supporting capabilities encompassing the one or more citizen-facing capabilities for assisting the one or more citizen-facing capabilities in working together; and one or more infrastructure capabilities for coordinating strategy among and infrastructure support across the one or more citizen-facing capabilities and one or more supporting capabilities.

In a further embodiment of the present invention, a border management application architecture is disclosed. The border management application architecture includes a set of core applications for standard border management functions, and case management and intelligence applications; a set of customer channels for providing individual access points for the users of the border management application architecture; a customer channel interface interconnecting the set of customer channels and the set of core applications; one or more management access channels for providing access points and tools for the sharing and access of border management data across border management capabilities; and one or more management access interfaces interconnecting the one or more management access channels with the set of core applications.

In another embodiment of the present invention, a border management solution is disclosed. The border management solution includes an immigrants, travelers and trade capability quadrant with associated business processes for managing the entry and exit of people and cargo; a requests and applications capability quadrant with associated business processes for processing documents associated with immigrants, travelers, and trade; a detection and enforcement capability quadrant with associated business processes for patrolling and monitoring passengers and trade; an investigation and intelligence capability quadrant with the associated business processes for identifying and investigating unusual activity and trends associated with the entry and exit of people and trade; and one or more supporting elements for storing collecting and storing information collected and intelligence developed with the border management solution.

In a further embodiment of the present invention, a method for processing an applicant through a requests and applications quadrant of a border management solution is disclosed. The steps of the method include preparing an application by the applicant, submitting the application to a case database of the border management solution, attending an interview with border management personnel, and rendering a decision by the border management personnel.

In another embodiment of the present invention, a method for processing a passenger arrival and departure through an immigrants, travelers, and trade quadrant of a border management solution is disclosed. The method includes the steps of receiving advance passenger manifest, storing the advance passenger manifest into a case database of the border management solution, interviewing an arriving passenger, and rendering a decision.

In another embodiment of the present invention, a method for detecting and enforcing border management laws through a detection and enforcement quadrant of an integrated border management solution is disclosed. The method includes the steps of alerting a border management enforcement officer, reviewing case information by the border management enforcement officer, and rendering a decision.

In a further embodiment of the present invention, a method of investigating a passenger through an investigation and intelligence quadrant of a border management solution is disclosed. The method includes the steps of collecting border intelligence, reviewing border intelligence, analyzing border intelligence, and generating an action based on the analysis of border intelligence.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof, as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to various embodiments of the present invention, examples of which are illustrated in the accompanying drawings.

Figure 1:
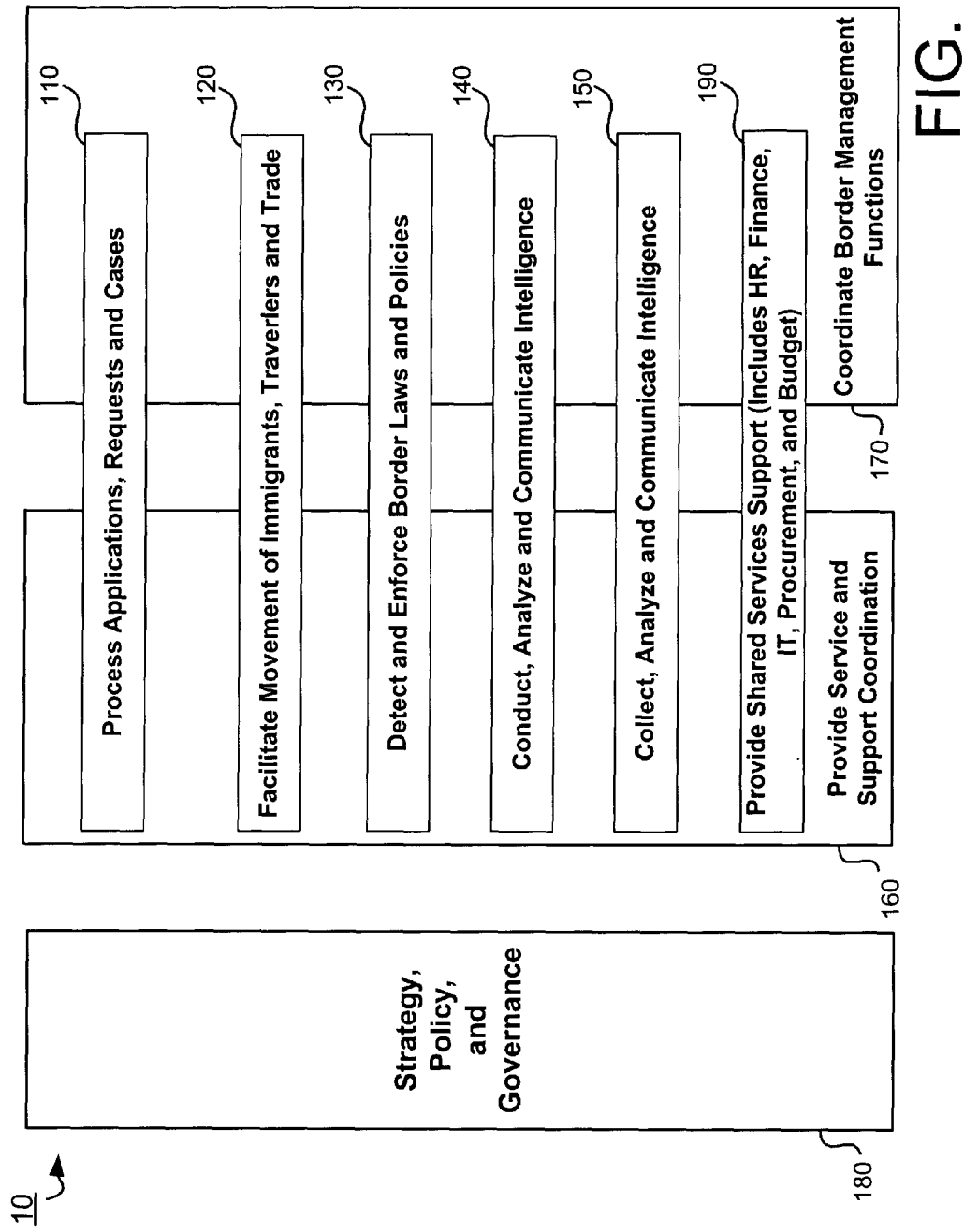
FIG. 1 shows the border management business architecture according to an embodiment of the present invention.

FIG. 1 shows the overview of the border management business architecture 10 according to the present invention. The border management business architecture 10 defines the structure for developing a border management solution in terms of its capabilities and their interrelationships. Also encompassed within the business architecture are the supporting process, application, technology, organization, competency, culture, communication, and collaboration architectures.

As shown in FIG. 1, the border management business architecture 10 includes five citizen-facing capabilities: Process Applications, Requests and Cases 110; Facilitate Movement of Immigrants, Travelers, and Trade 120; Detect and Enforce Border Laws and Policies 130; Conduct Enforcement Investigations 140; and Collect, Analyze, and Communicate Intelligence 150. The Process Applications, Requests and Cases capability 110, and Facilitate Movement of Immigrants, Travelers and Trade capability 120 focus on direct interaction with citizens, visitors, immigrants, and members of the trade to facilitate entry and exit of people and commerce into and from a country. The Detect and Enforce Border Laws and Policies capability 130, Conduct Enforcement Investigations capability 140; and Collect, Analyze, and Communicate Intelligence capability 150 focus more on enforcement of immigration, customs, and other border-focused laws.

Also included within the border management business architecture 10 are a Provide Service and Support Communication capability 160 and a Coordinate Border Management Functions capability 170, which encompass the five-citizen facing capabilities and assist them in working together. The Provide Service and Support Communication capability 160 supports the five customer-facing capabilities and serves as an interface to clients, including immigrants, travelers and the trade. The Coordinate Border Management Functions capability 170 supports the five customer-facing capabilities by coordinating activities between the other capabilities.

The Strategy, Policy and Governance capability 180, and Provide Shared Services Support capability 190 provide an infrastructure of support and governance for border management functions. The Strategy, Policy and Governance capability 180 defines the strategy across border management functions, regardless of the entity responsible for that function, the policies to support the strategy, and an overall governance and leadership structure providing continuous and clear direction. The Provide Shared Services Support capability 190 provides infrastructure such as human resource, finance, information technology, procurement and budget to the border management entities.

Figure 2:
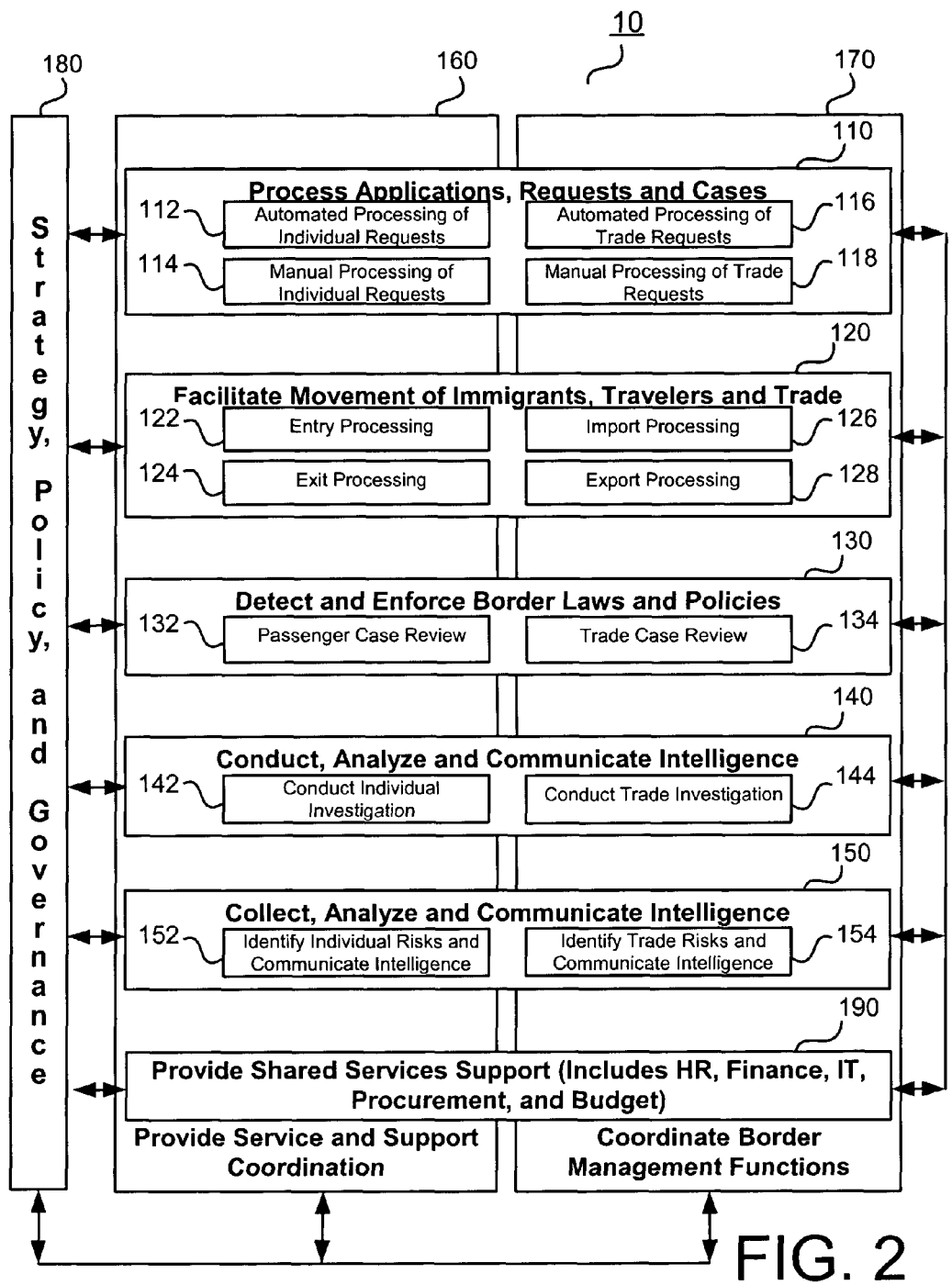
FIG. 2 shows a detailed view of the process architecture incorporated in the border management business architecture according to an embodiment of the present invention.

FIG. 2 shows the business processes associated with each capability and the flow of communication among the capabilities within the border management business architecture 10 according to an embodiment of the present invention. The business processes within each capability provide a set of logically related activities combined to produce a business outcome. The processes, according to various embodiments, may involve both manual and automated activities.

Turning to FIG. 2 specifically, each capability within the border management business architecture 10 provides the detailed processes for managing both individuals, such as immigrants and tourists, as well as trade. According to one embodiment, processes associated with the Process Applications, Requests and Cases capability 110 include processes for use with immigrants and travelers, such as automated processing of individual requests 112, manual processing of individual requests 114, and processes for use with trade, such as automated processing of trade requests 116, and manual processing of trade requests 118.

Automated processing of individual requests 112 provides for the collection and processing of electronic requests. According to an embodiment of the present invention, the automated processing may be provided for such things as visa or asylum requests, or customs declarations. For example, a visa request may be electronically prepared and submitted. This request would then be automatically processed based on the information and history provided by an individual. Manual processing of individual requests 114 occurs when an individual's request cannot be processed automatically due to a complicated request or a paper submission.

Automated processing of trade requests 116 may also be provided for the collection and processing of electronic trade requests. According to an embodiment of the present invention, automated processing may be provided for such things as import and export requests. In a similar manner to that provided for individuals, electronic requests may be prepared and automatically processed based on the information provided by the importer or exporter. Manual processing of trade requests 118 will also occur when a request cannot be processed automatically due to a complicated request or a paper submission.

The Facilitate Movement of Immigrants, Travelers and Trade capability 120, according to a further embodiment of the present invention, also includes processes associated with immigrants and travelers, and trade. According to the embodiment shown in FIG. 2, the processes used with immigrants and travelers include entry processing 122, and exit processing 124, and those for use with trade include import processing 126, and export processing 128.

Entry processing 122 verifies authorization for the admission of a visitor and records arrival details, such as date and time, port of entry, and intended destination. Exit processing 124 tracks departure information for a visitor.

Import processing 126 verifies authorization for the clearance of cargo and records import details, such as date and time, port of entry, and intended destination. Export processing 128 tracks export information for cargo.

According to an embodiment of the present invention, the Detect and Enforce Border Laws and Policies capability 130 include passenger case review 132, and trade case review 134. Passenger case review 132 provides real-time access to traveler information, criminal history, and other law enforcement information and applications that an inspector needs to complete an interview of a passenger and to approve or deny entry. Trade case review 134 automatically identifies shipments that should be inspected, directs an inspector to the shipment to be inspected, and provides real-time access to case information, history, and other critical information that an inspector needs to complete an inspection and to approve or deny clearance.

The processes associated with the Conduct Enforcement and Investigations capability 140 include conduct individual investigation 142, and conduct trade investigation 144. Conduct individual investigation 142 focuses on identifying and locating individuals not in compliance with immigration regulations, alerting individuals to possible violations of the law, apprehending non-compliant individuals, and serving deportation orders. Conduct trade investigation 144 focuses on investigating illegal or suspicious trade activity, identifying the source of illegal goods, stopping smuggling operations, and working with overseas law enforcement and border management agencies.

The processes associated with the Collect, Analyze and Communicate Intelligence capability 150 include identify individual risks and communicate intelligence 152, and identify trade risks and communicate intelligence 154. Identify individual risks and communicate intelligence 152 gathers information about individuals who may pose a threat to country, synthesizes this information to form intelligence, and communicates the intelligence to officers for evaluation. And based on the evaluation, an officer may alert other border management personnel to potential threats.

Identify trade risks and communicate intelligence 154 gathers information about non-compliant and illegal trade, synthesizes this information to form intelligence, and communicates the intelligence to officers for evaluation. Based on the evaluation, and officer may alert other border management personnel to potential threats or trade compliance issues.

According to the present invention, applications can be defined based on these business processes in order to use technology to enable the processes to be executed. All other elements within a capability are also aligned with the core business processes within that capability. Tightly integrated and coordinated business processes, such as those illustrated in FIG. 2, provide the framework required for excellent customer service and citizen security.

Figure 3:
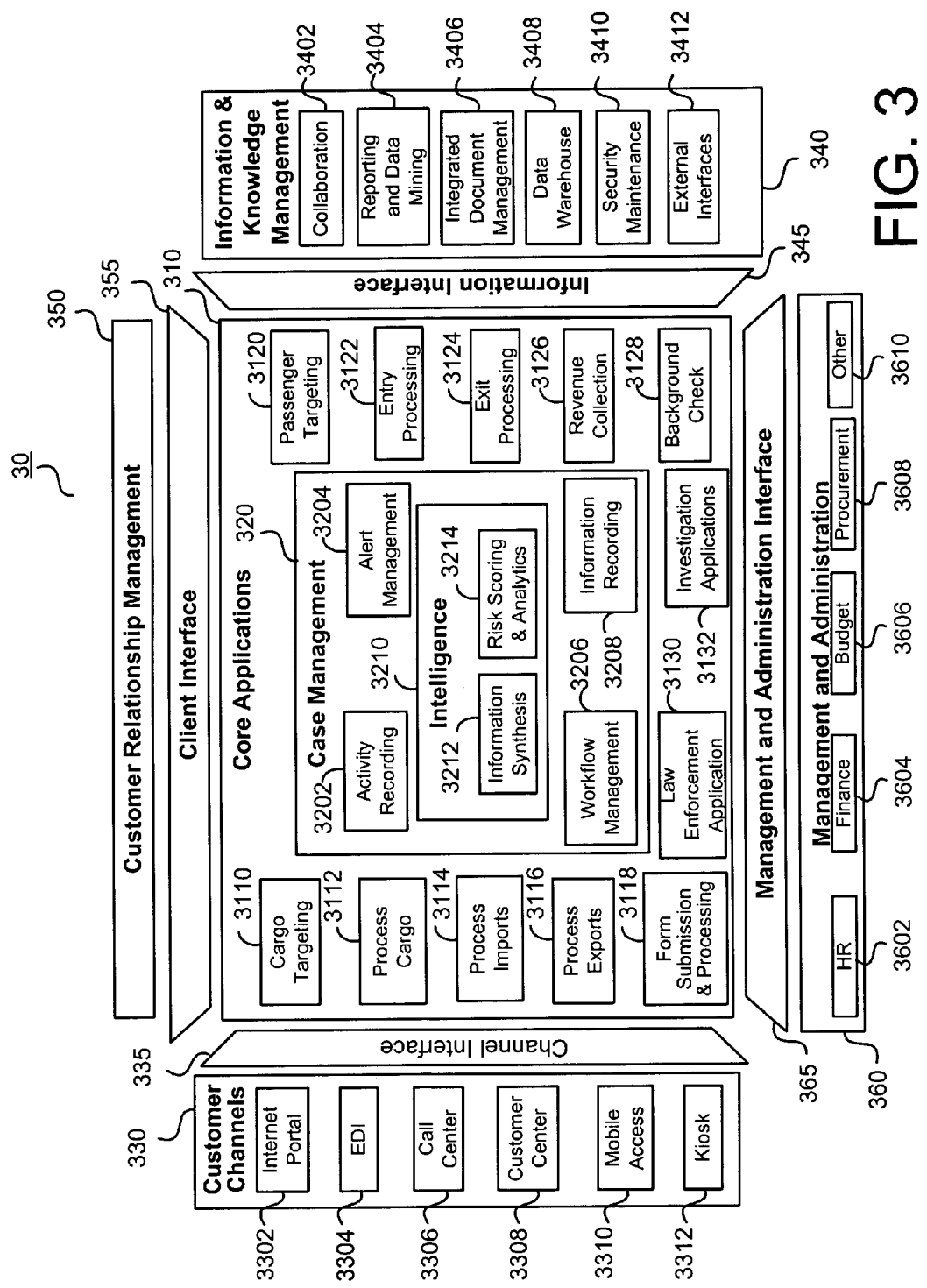
FIG. 3 shows a detailed view of the application architecture of the border management business architecture according to an embodiment of the present invention.

FIG. 3 shows the application architecture 30 within the border management business architecture 10. According to an embodiment of the present invention, the application architecture 30 provides the core applications 310, interfaces 335, 345, 355, 365, customer channels 330, and information and knowledge management tool sets 340, 350, and 360. Successful execution of border management capabilities is dependent on the sharing of data and providing access to that data across all border management capabilities within the border management solution. The application architecture 30 provides the ability to share data and provide access to that data across all border management capabilities with in a secure framework. According to an embodiment of the present invention, applications may be customized to job functions and roles and still allow access to a centralized data source.

Turning to FIG. 3 in particular, the core applications 310 of the application architecture 30 represent standard border management related functions, as well as case management applications, and intelligence applications. According to an embodiment of the present invention, core applications may include cargo targeting 3110, process cargo 3112, process imports 3114, process exports 3116, form submission and processing 3118, passenger targeting 3120, entry processing 3122, exit processing 3124, revenue collection 3126, background check 3128, law enforcement applications 3130, investigation applications 3132, and case management applications 320. The case management applications 320 may further include activity recording 3202, alert management 3204, workflow management 3206, information recording 3208, and intelligence applications 3210, such as information synthesis 3212, and risk scoring and analytics 3214.

Access to the core applications 310 of the application architecture 30 is available through various access channels, such as the customer channels 330, information and knowledge management 340, customer relationship management 350, and management and administration 360. Each channel is provided a channel specific interface between the access channel and the core applications to ensure proper security and allow access to only authorized applications and data from each access point within each channel. According to an embodiment of the present invention, the interfaces include a channel interface 335, a client interface 345, an information interface 355, and a management and administrative interface 365.

The customer channels 330 provide individual access points for the users of the border management application architecture 30. For example, the customer channels 330 may include an internet portal 3302, an electronic data interchange ("EDI"), 3304, call center 3306, customer center 3308, mobile access 3310, or kiosk 3312.

The information and knowledge management tool set 340 provides the access points and tools for the sharing and access of data across border management capabilities. The information and knowledge management tool set 340 may include collaboration 3402, reporting and data mining 3404, integrated document management 3406, data warehouse 3408, security maintenance 3410, and other external interfaces 3412.

The border management application architecture 30 also provides customer service as well as day-to-day management and administration access to the core applications 310 and data. Customer relationship management 350 provides an access channel to allow for assistance with customer inquiries or problems.

The management and administration tool set 360 provides an access channel for typical management and administration purposes and may include human resource tools 3602, finance tools 3604, budget tools 3606, procurement tools 3608, or other management and administration tools 3610.

Figure 4:
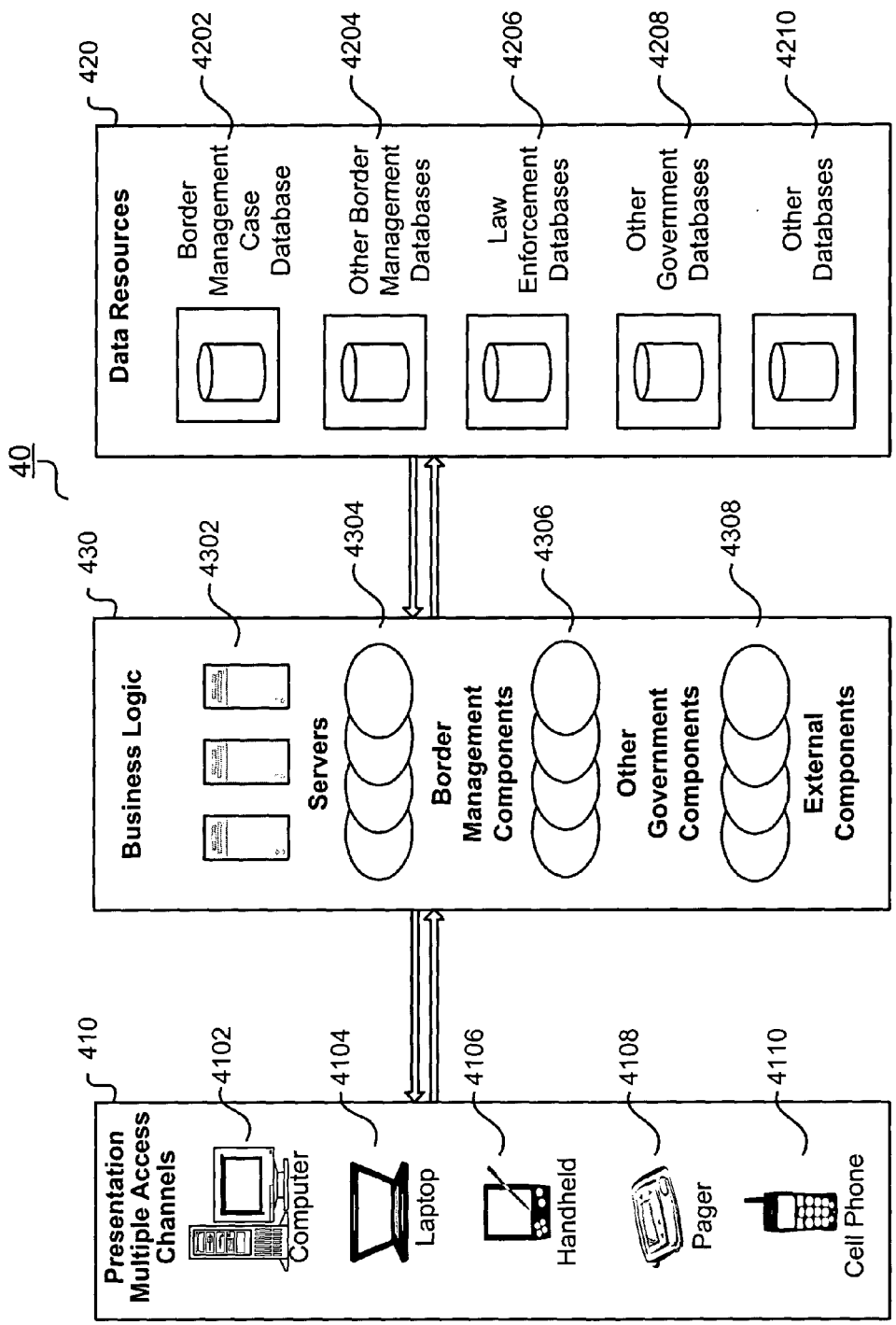
FIG. 4 shows the technology architecture of the border management business architecture according to an embodiment of the present invention.

FIG. 4 shows the technology architecture 40 according to the present invention. The technology architecture 40 supports multiple electronic access channels 410 to disparate data resources 420, such as internal databases, or external information sites, that are reachable by users, such as internal users, customers, and external partners. Business logic 430 between the multiple access channels 410 and the data resources 420 manages and coordinates the transfer of data.

The multiple access channels 410 provide the ability to access applications and data resources 420 via various electronic devices, such as computer workstations 4102, laptops 4104, as well as mobile computing devices including handheld computers 4106, pagers 4108, and cell phones 4110. From the multiple access channels 410 a user may use available applications, as well as view, input, or modify data accessible through the technology architecture 40.

Business logic 430 provides the management necessary to coordinate the user applications and the transfer of data between the access channels 410 and the data resources 420. According to an embodiment of the present invention, business logic 430 may include servers 4302, border management components 4304, other government components 4306, and external components 4308.

Within the technology architecture 40, data resources 420 may contain internal databases, such as border management case databases 4202 or other border management databases 4204, or external information sites, such as law enforcement databases 4206, other government databases 4208, or other databases 4210.

The technology architecture 40 is based on netcentric architecture and is developed to allow geographically dispersed and often highly mobile users access to information in a quick and efficient manner. A flexible, scalable, and secure netcentric architecture provides the ability to deliver information anytime and anywhere it is needed to support border management functions.

Figure 5:
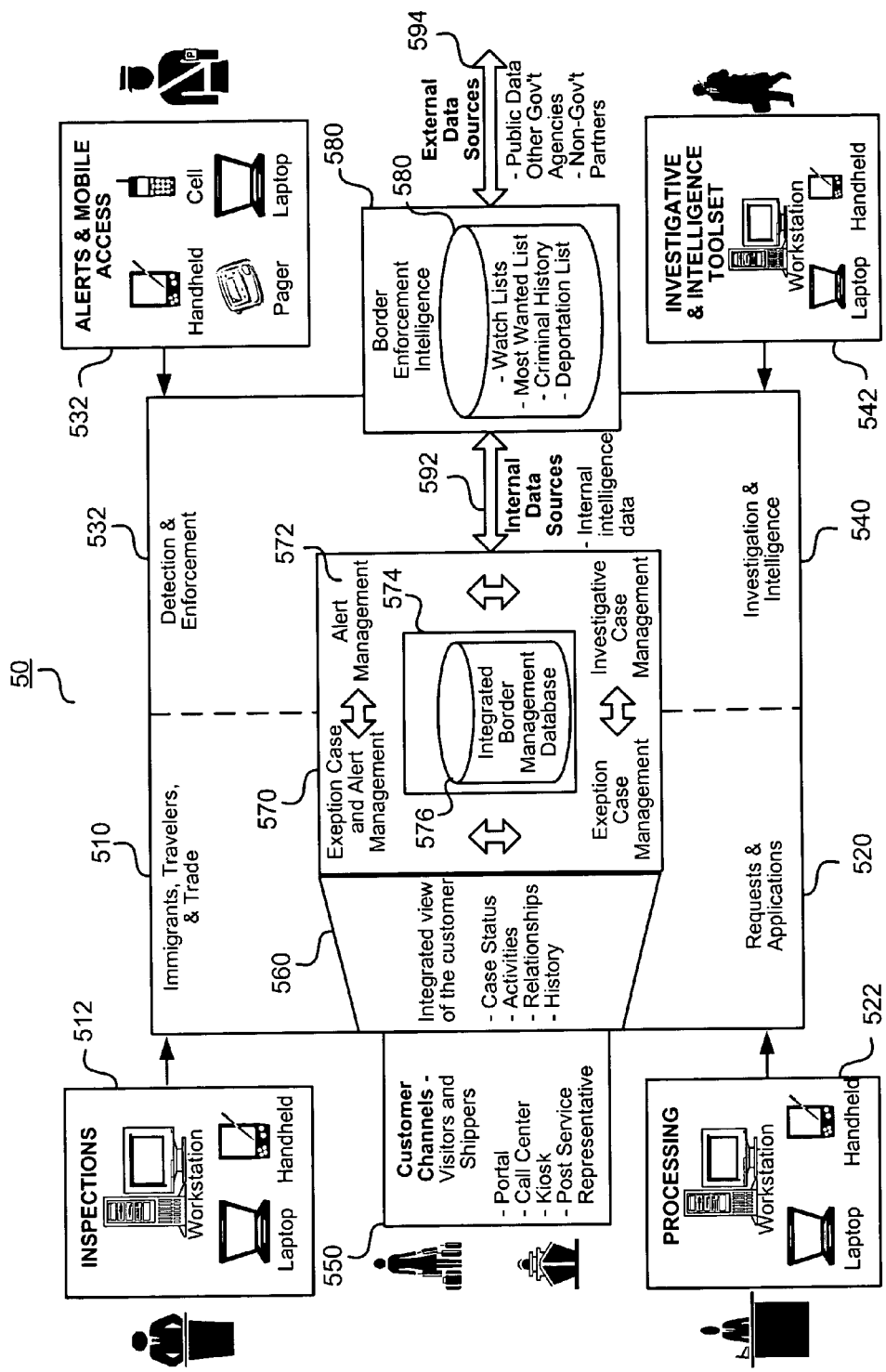
FIG. 5 shows an embodiment of the integrated border management solution according to an embodiment of the present invention.

FIG. 5 shows the integrated border management solution 50 according to an embodiment of the present invention. The border management solution 50 shown in FIG. 5 is based around four capability quadrants 510, 520, 530, and 540. The capability quadrants 510, 520, 530, and 540 include two customer-facing quadrants and two enforcement and security-focused quadrants. The two customer-facing quadrants are the immigrants, travelers and trade quadrant 510, and the requests and applications quadrant 520. The two enforcement and security-focused quadrants are the detection and enforcement quadrant 530, and the investigation and intelligence quadrant 540.

The immigrants, travelers, and trade quadrant 510 focuses on the entry and exit of people and cargo. The arrival or departure of an individual or the import or export of goods will typically trigger activities within this quadrant. According to an embodiment of the present invention, actions within the immigrants, travelers, and trade quadrant 510 may include recording and matching an individual's entry or exit, verifying a passenger's identity, verifying the origin of cargo, and verifying the authorization for entry or passengers or goods. For example, when a person or goods enter or exit a country, inspectors collect and enter information at an inspection station 512 via a workstation, laptop, handheld, or other computing device. From this information the border management solution 50 may verify the information or may generate an alert. Exception cases are also managed to provide an appropriate level of scrutiny.

The requests and applications quadrant 520 focuses on the processing of documents associated with immigrants, travelers, and trade. The submission of a form or application triggers activity within this quadrant. According to an embodiment of the present invention, actions within the requests and applications quadrant 520 may include visa processing, asylum processing, customs declaration processing, and form and application processing. As an example, forms and applications may be provided to a processing location 522. The requests and applications quadrant 520 facilitates the review and approval of the forms and applications. Exception cases are noted and provided for further investigation and intelligence analysis, as well as identifying specific travelers or items requiring additional attention.

The detection and enforcement quadrant 530 focuses on patrolling and monitoring passengers and vehicles to identify suspicious behavior that may not be observed or viewable by an inspector at an inspection station 512. Unusual entry or exit activity, overstay, or other suspicious activity triggers activity in this quadrant. For example, security or law enforcement officials may identify irregular activity or behavior through observation or questioning passengers or shippers. This activity or an alert may be reported by the security or law enforcement officials through alerts and mobile access locations or devices 532, such as handheld devices, cell phones, pagers, laptops other computing devices.

The investigation and intelligence quadrant 540 is responsible for analyzing information gathered from the other three quadrants to identify unusual activity and trends at the borders. A tip or intelligence generated from within the border management solution or externally triggers activity in this quadrant. According to an embodiment of the present invention, activities within this quadrant include investigation and analysis of irregular entry, exit, or other events or behaviors, identifying visitors who have stayed beyond their authorized stay deadline. For example, through a tip, alert, or other intelligence, an investigator may use an investigative and intelligence toolset 542 using workstations, laptops, handheld devices, or other computing devices to further review and investigate a case.

The border management solution 50 in FIG. 5 also includes various supporting elements such as customer channels 550, integrated view of the customer 560, border management knowledge 570, and border enforcement intelligence 580. Combining the capability quadrants 510, 520, 530, and 540 with the supporting elements 550, 560, and 570 provides and integrated solution to border management allowing for the creation and maintenance of a centralized knowledge base.

Customer channels 550 provide a variety of access channels for the end customer, whether traveler, immigrant, or shipper, to interact with border management employees, processes, and systems. Access channels may include portals, call centers, kiosks, a port service representative, or any other point of interaction. Through the customer channels 550 a customer is able to complete forms and applications, as well as update information and check the status of any ongoing request.

The integrated view of the customer 560 enables employees to provide efficient and effective customer service while also allowing for an enforcement view. As a customer provides information and interacts with border management employees through the processing of requests and applications, traveling through entry and exit points, and any investigation and intelligence development, a single knowledge base is created allowing for a single, complete view of a customer. The integrated view of the customer allows for case status review, activities analysis, review of relationships, and the development of a history.

The border management knowledge element 570 includes the border management applications 572 and border management knowledge base 574, including an integrated border management database 576. Through the border management knowledge element, employees, as determined by their role and need are provided access to view, use, and update information stored in the integrated border management database about a particular customer or case. Access to border management applications 572, the border management knowledge base 574, and the border management database 576 is provided through the access points 512, 522, 532, and 542 of the four primary capability quadrants 510, 520, 530, and 540 and the customer channels 550 of the border management solution 50. Through these access points, information may be entered, modified, reviewed and used. The border management database 576 provides a centralized location to store all data received by, and developed within, the border management solution.

Border enforcement intelligence element 580 provides the tools, including an intelligence engine, to transform data and information about an individual or a case into knowledge and intelligence that can be acted upon to secure the borders, protect citizens, or make decision about necessary enforcement actions. The border enforcement intelligence element 580 also includes an enforcement database 582 that may include watch lists, most wanted lists, criminal history reports, and deportation lists.

Conduits 590 and 592 also allow the border management knowledge element 570 to access internal and external databases. According to one embodiment of the present invention an internal conduit 590 provides the border management knowledge element 570 access to internal data sources, such as the border enforcement intelligence element 580. According to this embodiment, the internal conduit 590 allows the border management knowledge element 570 to use intelligence data generated by the border enforcement intelligence element 580 and other internal data sources in its development of border management knowledge.

A further embodiment includes an external conduit 592 from the border enforcement intelligence element 580 to external data sources, such as public data from other government agencies and non-government partners. By combining the data maintained in the integrated border management database 576 with other internal and external databases a more complete picture of a person or a case can be developed for further action by the enforcement entities.

Border enforcement intelligence 580 provides the ability for enforcement officials to transform the data contained in the border management database and combine it with information collected from other internal and external sources to develop knowledge and intelligence. For example, the border enforcement intelligence database 582 may also include watch lists, most wanted lists, criminal histories, and deportation lists.

The border management solution 50 and border enforcement intelligence element 580 include data warehousing and mining environments to support the identification of threats and trigger alerts to appropriate individuals in the field. The data warehousing solutions allow enforcement officials to synthesize information, identify patterns, analyze historical information, develop risk scores, and form intelligence. Data mining includes such applications as rules-based analysis, neural networks, decision tree analysis, and other data recognition techniques. Data source indexing facilitates access to and analysis of the data in support of risk assessment.

In operation the integrated border management solution provides for the collection and use of information and intelligence analysis to protect a country at its borders. FIGS. 6 through 9 illustrate examples of the process flow associated within each of the four primary quadrants illustrated in FIG. 5. In each example, information is stored in, or retrieved from, a case database that maintains case materials, biometric information, and provides alerts under certain circumstances. The case database is interconnected with various other databases, such as other border management agency databases, INS databases, other law enforcement databases, and other government databases. With the information gathered from the various available databases, intelligence may be developed in conjunction with the information stored in the case database. The collected information and intelligence developed within the integrated border management system provides enhanced capabilities for protecting a country's borders.

Figure 6:
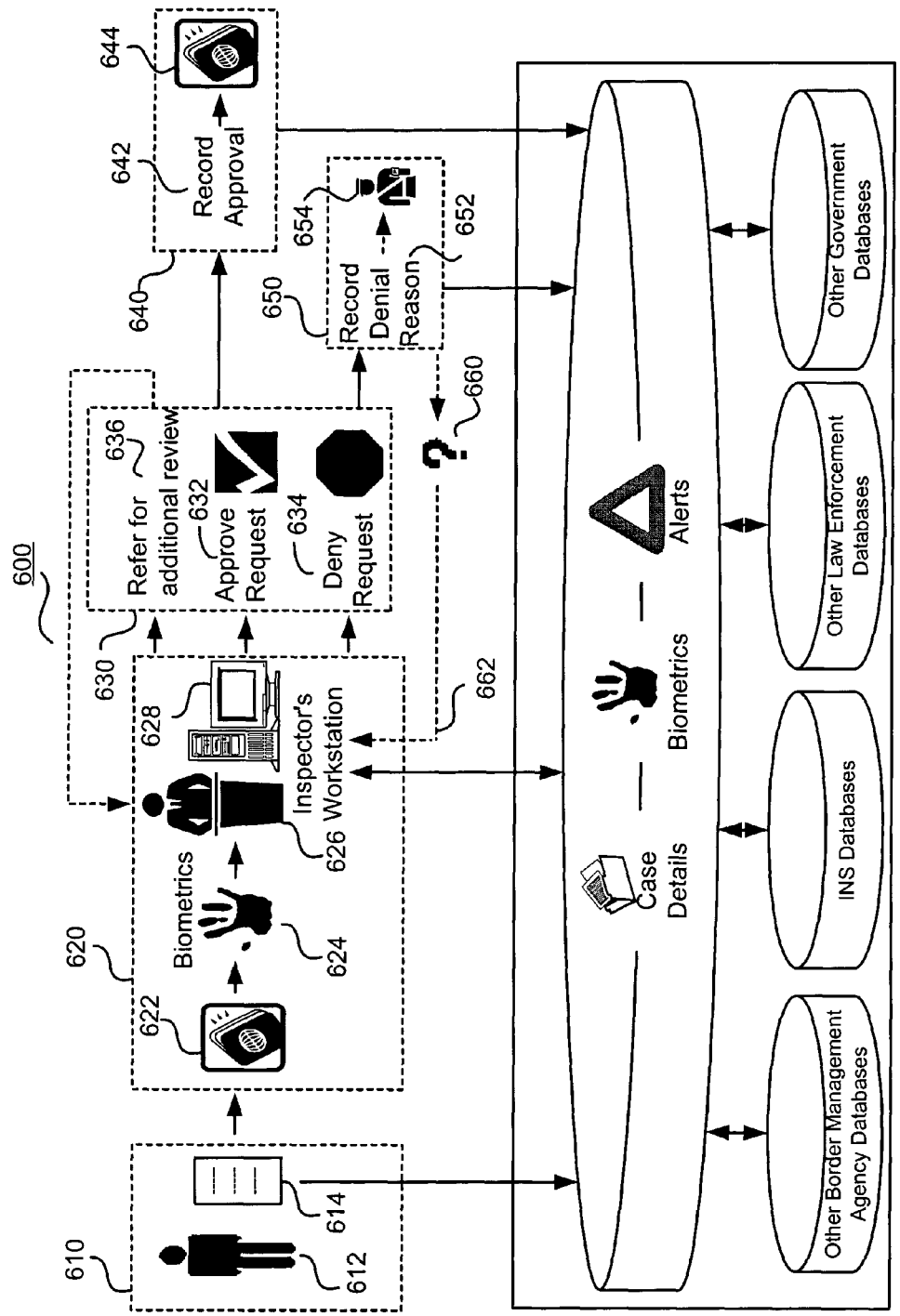
FIG. 6 illustrates an overview of the process flow through the requests and applications quadrant of the integrated border management solution, according to an embodiment of the present invention.

FIG. 6 illustrates an overview of the process flow for an applicant through the requests and applications quadrant 520 of the integrated border management solution 50, as shown in FIG. 5, according to an embodiment of the present invention. As depicted in FIG. 6, the requests and applications process overview 600 provides for request or application preparation 610, an interview with the applicant 620, a decision regarding the request or application based on the application information and interview 630, an approval process 640, a denial process 650, and a referral process 660.

In FIG. 6, the requests and applications process 600 begins with the preparation of an application or request 610. Accordingly, an applicant 612 prepares the application or request 614 and submits it to the case database of the integrated border management solution. As described above, the applicant 612 prepares the application or request at any of the available customer channels 550, as shown in FIG. 5.

Once the appropriate application or request 614 is completed, the applicant schedules and attends a review and interview 620. During the interview 620, the applicant presents identification and any required supporting documentation 622. In a further embodiment, the customer may also be required to provide a biometric signature 624. Biometric information 624 may include, for example, fingerprints or an iris scan.

During the interview 620 a border management interviewer 626 reviews the materials provided, including any details of a particular request, any associated paperwork, and any case history that has been developed, as well as interviews the applicant. During the interview 620, the border management interviewer 626 may access information located on the case database of the border management solution through the interviewer's workstation or other computing or communications device 628. Using the border management solution the interviewer may identify any related cases or alerts, and record his or her notes from the interview. Any additional information provided by the applicant and collected through the review and interview 620 is also entered into the case database.

After the review and interview 620, a decision 630 is rendered regarding the application or request 614. In one embodiment of the present invention, the decision 630 may be one of three options. Namely, a case can be approved 632, denied 634, or referred for additional processing 636. If approved 632, the case moves to approval processing 640 where the approval is recorded in the case database 642 and the appropriate documentation 644, such as a visa or passport, is created. The preparation of documentation is also recorded into the case database.

In the event a request or application is denied 634, the case moves through the denial processing 650 where the denial is recorded in the case database 652 and the case is referred to the appropriate law enforcement agency 654.

An appeal 660 is also available for those wishing to challenge the denial 634. In the case of an appeal 660 the applicant returns to a border management interviewer 626 for further processing, wherein new information is provided. The new information is also entered into the case database, and the application process repeats from that point.

In the case of a referral for additional review 636, the applicant is scheduled for additional reviews, interviews, or other follow-up appointments, for example a doctor's visit. The applicant returns to the border management interviewer 626 for further processing. Any new information is provided and entered into the case database and the application process repeats from that point.

Throughout the processing of a request or application, the information input into the database, such as case details, biometrics, and alerts, may be combined with data from other internal and external databases. This combined information provides additional resources and intelligence with which a decision regarding the request or application can be based.

Figure 7:
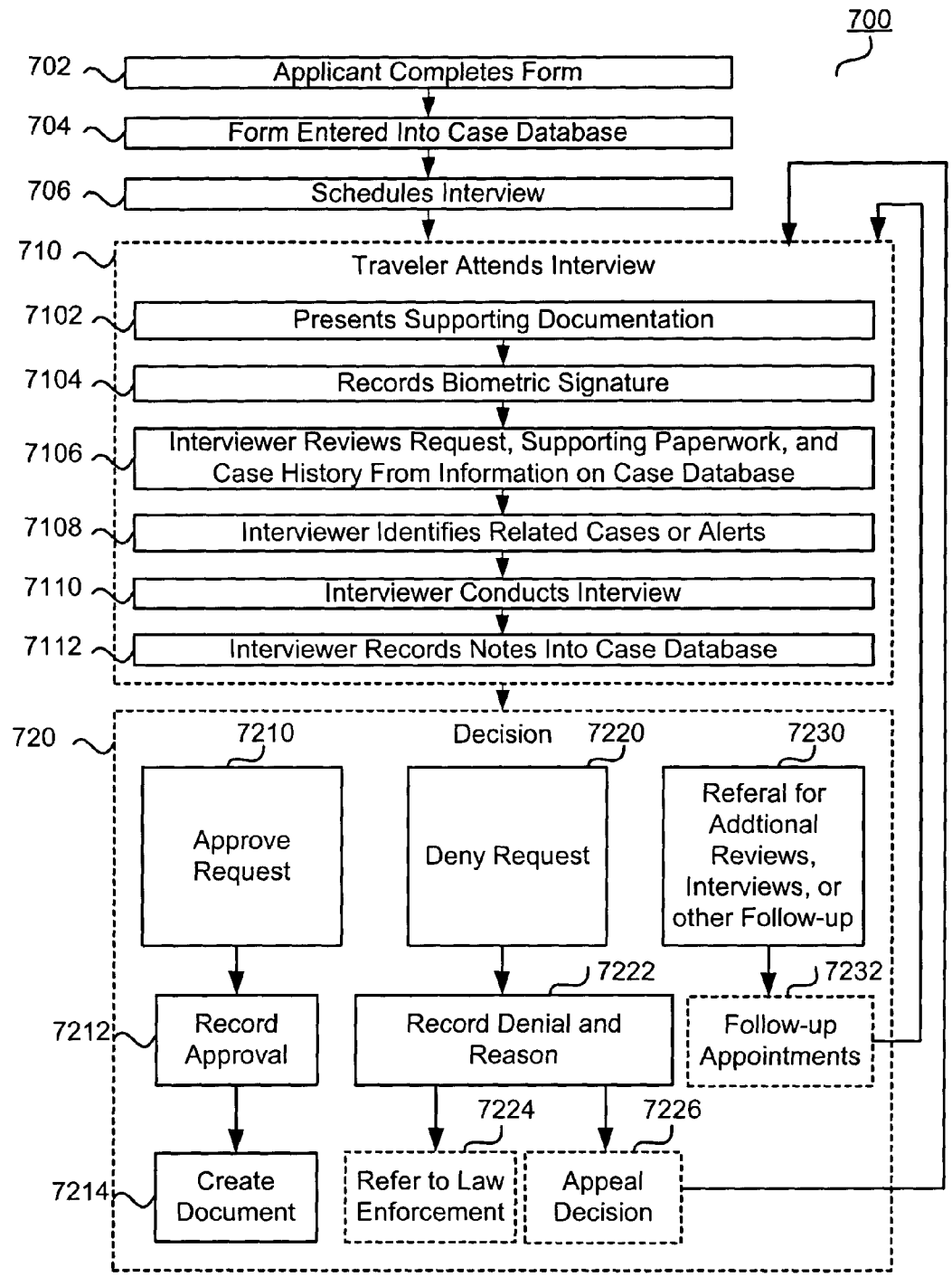
FIG. 7 illustrates a detailed view of the processing steps for an applicant through the requests and applications quadrant of the integrated border management solution, according to an embodiment of the present invention.

FIG. 7 illustrates a detailed view of the processing steps for an applicant through the requests and applications quadrant 520 of the integrated border management solution 50, as shown in FIG. 5, according to an embodiment of the present invention. As depicted in FIG. 7, the process begins with a form completion step 702 in which an applicant completes an application or request form. In the form entry step 704 the information provided by the applicant is entered into the case database of the border management solution. After the applicant completes the application, the applicant schedules an interview with a border management inspector in the schedule interview step 706.

At the scheduled time, the applicant meets with the inspector during the attend interview step 710. The applicant attends interview step 710 includes additional sub-steps for the collection of additional information, a review of the provided information and an interview with the applicant. According to an embodiment of the present invention, the applicant attends interview step 710 includes the following sub-steps: applicant presents supporting documentation sub-step 7102, record biometric signature sub-step 7104, interviewer reviews provided information sub-step 7106, interviewer identifies related cases or alerts sub-step 7108, interviewer conducts interview sub-step 7110, and interviewer records notes into case database sub-step 7112.

The applicant presents supporting documentation sub-step 7102 provides the applicant an opportunity to provide any requested or additional materials supporting the application or request. The most basic of which may be proper identification in order to verify that the applicant is attending the proper interview. Additional supporting documentation may include a passport or any other previously generated travel documents.

According to an embodiment of the present invention, the record biometric signature sub-step 7104 provides an opportunity to collect biometric information, such as fingerprints, an iris scan, or other unique identifying information. The biometric signature is stored with the applicants data on the case database and may be retrieved at any time to verify the applicants identity.

The interviewer then reviews the materials provided by the applicant in the interviewer reviews provided information sub-step 7106. The interviewer may also identify and retrieve related materials in the interviewer identifies related cases or alerts sub-step 7108.

Once the available information is collected and reviewed by the interviewer, the interviewer interviews the applicant in the interviewer conducts interview sub-step 7110. Any notes or additional information gleaned from the interview are then recorded in the case database in the interviewer records notes into case database sub-step 7112.

Once an interview is completed, a decision on the application is then made in the decision step 720. The decision step 720 may include an approval of the application sub-step 7210, a denial of the application sub-step 7220, or a referral for additional follow-up sub-step 7230. For an application that is approved in the approval of the application sub-step 7210 the approval is recorded in the case database in the record approval sub-step 7212 and the appropriate travel document is generated in the create document sub-step 7214.

For an application that is denied in the denial of the application sub-step 7220, the denial and reasons for the denial are recorded in the case database in the record denial and reason sub-step 7222. In some instances, a denied application is referred to law enforcement in the refer applicant to law enforcement sub-step 7224.

An applicant whose application is denied also has an opportunity to appeal the decision in the appeal decision sub-step 7226. In the appeal decision sub-step 7226, the applicant is allowed to schedule an additional interview and repeat the attend interview step 710. The applicant would be encourage to provide additional supporting information address any deficiencies or issues noted in the record denial and reason sub-step 7222.

An application that is not in a position for approval or denial may be referred for additional review or information in the referral for additional review or follow-up sub-step 7230. In this follow-up sub-step 7230, the applicant is provided with specific items requiring additional review, interviews, or follow-up. For example, an applicant may be required to obtain additional supporting documentation, complete a medical exam, or receive required inoculations. During the follow-up sub-step 7232, an applicant collects the required information or complies with the specified requirements, and schedules an additional interview.

It can be appreciated that an application for a visa, asylum, or other travel or immigration document will follow the same pattern as that outlined above. It can be further appreciated that a request for shipping of trade will also be processed in a manner similar to that of the immigrant or traveler applicant described above and illustrated in FIGS. 6 and 7. For example, a shipper will submit an application or request, schedule an interview, and provide any additional supporting information at the interview.

The shippers application or request will be reviewed along with the supporting paperwork and any case history available from the border management solution. A decision will also be processed allowing or denying a shipment, or referring the application or request for further processing. As with a traveler or immigrants application, all information collected during the process will be recorded into the case database of the border management solution.

Figure 8:
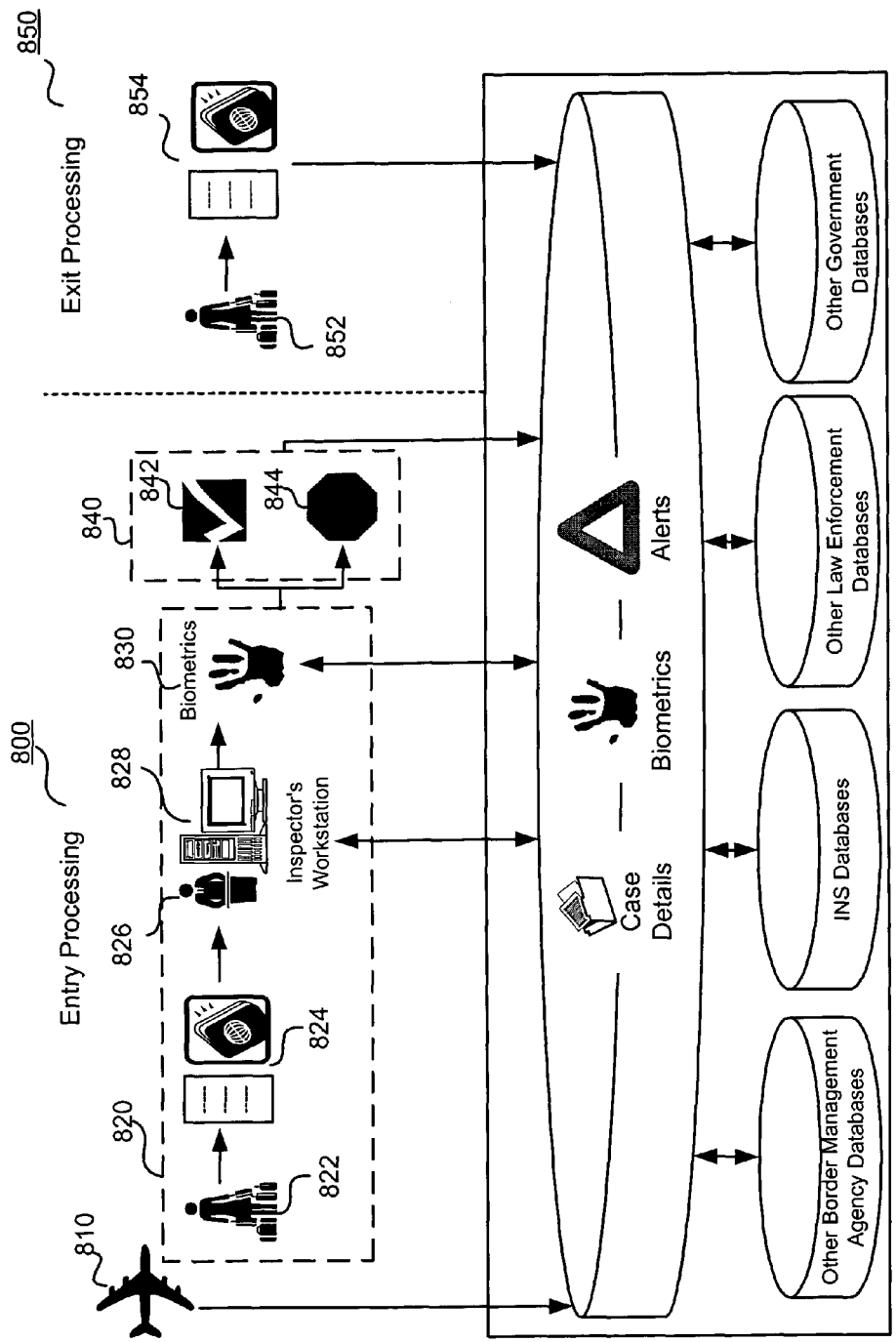
FIG. 8 illustrates an overview of the process flow through the immigrants, travelers, and trade quadrant of the integrated border management solution, according to an embodiment of the present invention.

FIG. 8 illustrates an overview of the process flow for a passenger through the immigrants, travelers, and trade quadrant 510 of the integrated border management solution 50, shown in FIG. 5, according to an embodiment of the present invention. FIG. 8 includes an overview of the entry processing 800 for an entry passenger 822 and exit processing 850 for an exit passenger 852.

As depicted in FIG. 8, entry processing 800 provides for the advance collection of flight manifest data 810, a review and interview process 820, and a decision process 840. Departure processing 850 provides for the collection and review of documents prior to departure.

The collection of flight manifest 810 involves receiving an advance copy of a passenger manifest. The manifest information is entered into the integrated border management case database.

The review and interview process 820 begins when an entry passenger 822 arrives at an airport terminal and presents his or her documentation 824 to an inspector 826. The inspector 826 reviews the presented documentation 824, along with any case file, and interviews the passenger. Information collected by the inspector 826 is entered into the case database using the inspector's computing device 828. The entry passenger's identity is also verified by comparing information presented by the entry passenger 822 with that stored on the case database. Identity verification may be made through any traditional method, as well as by comparing biometric information 830 obtained from the entry passenger 822 and comparing it with biometric information previously provided by the entry passenger 822.

A decision 840 is made on an entry passenger's entry status after the collected information has been reviewed and verified. The passenger's arrival can be accepted 842, or denied 844. The entry traveler's entry status, whether accepted or denied, is then entered into the case database. A denied entry traveler is also referred to border enforcement entities.

While exit processing 850 is a much shorter process than entry processing 800, ensuring accurate border management record keeping, as well as ensuring the ability to alert law enforcement agencies to a particular traveler of interest, are also important border management functions. Exit processing 850 simply involves the exit passenger 852 presenting his or herself for departure and presenting departure documentation 854. The departure documentation 854 is then scanned and the exit passenger's departure is recorded in the case database.

Figure 9A:
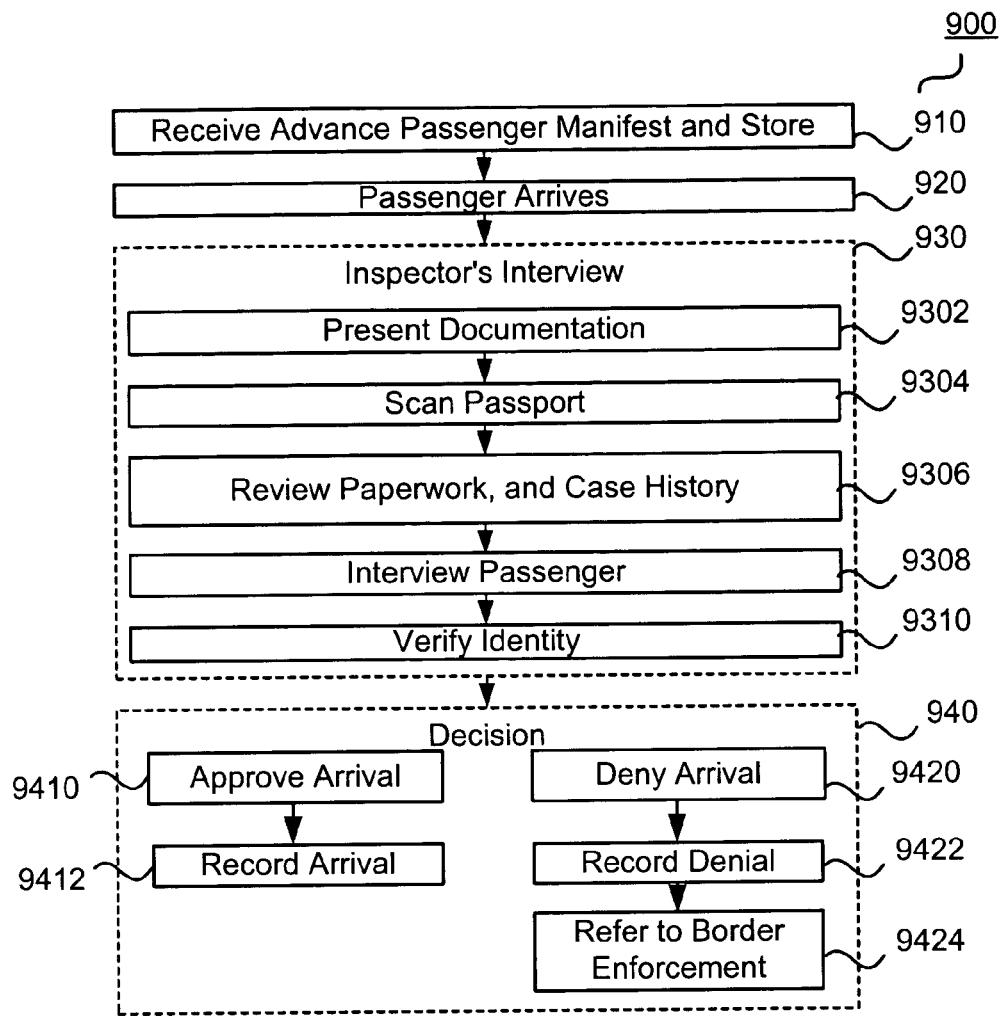
FIG. 9A illustrates a detailed view of the processing steps for an entry passenger through the immigrants, travelers, and trade quadrant of the integrated border management solution, according to an embodiment of the present invention.

FIG. 9A illustrates a detailed view of the entry processing steps of an entry passenger through the immigrants, travelers, and trade quadrant 510 of the integrated border management solution 50, as shown in FIG. 5, according to an embodiment of the present invention. In the detailed example shown in FIG. 9A, the passenger entry process begins with the receipt of an advance passenger manifest in the receive and store advance passenger manifest step 910. In step 910 the advance manifest is received prior to the arrival of an entry passenger listed on the manifest and the information contained in the manifest is stored in the case database.

The process continues when an entry passenger arrives in step 920. Upon arrival, the entry passenger begins an inspector's interview in the inspector's interview step 930. The inspector's interview step 930 begins the applicant presenting his or her travel documentation in the present documentation sub-step 9302. The entry passenger's passport is scanned in the scan passport step 9304.

The inspector reviews the entry passenger's paperwork and case history in the review paperwork sub-step 9306. The inspector then interviews the entry passenger in the passenger interview sub-step 9308. The inspector will also verify the entry passenger's identity in the verify identity sub-step 9310. In a further embodiment, the verify identity sub-step 9310 includes the verification of the entry passenger's identity by collecting biometric signature information from the entry passenger, such as fingerprints or an iris scan.

Once the inspector's interview step 930 is completed a decision is made in the decision step 940. An approval of entry may be made in the approve arrival sub-step 9410, or a denial of entry may be made in the deny arrival sub-step 9420. Upon approval of entry in the approve arrival sub-step 9410, the entry passenger's arrival is recorded in the case database in the record arrival sub-step 9412.

In the event that a passenger's entry is denied in the deny arrival sub-step 9420, the denial is recorded in the case database in the record denial sub-step 9422. After recording the denial, a referral of the case is made to border enforcement in the referral to border enforcement sub-step 9424.

Figure 9B:
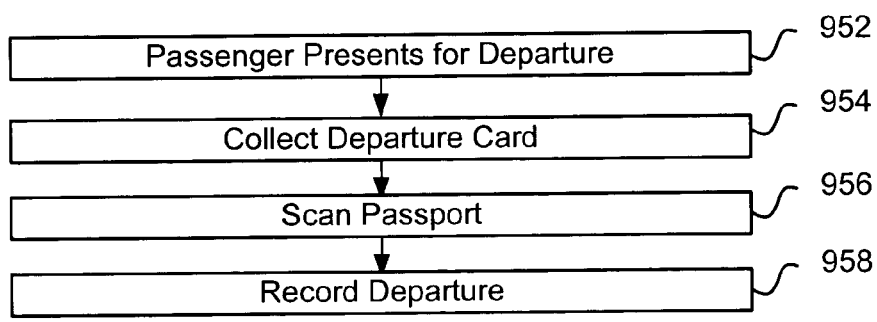
FIG. 9B illustrates a detailed view of the processing steps for an exit passenger through the immigrants, travelers, and trade quadrant of the integrated border management solution, according to an embodiment of the present invention.

FIG. 9B illustrates a detailed view of the exit processing steps of a departing passenger through the immigrants, travelers, and trade quadrant 510 of the integrated border management solution 50, as shown in FIG. 5, according to an embodiment of the present invention. As shown in FIG. 9B, the exit processing 950 begins when a departing passenger presents himself or herself for departure in the passenger presents for departure step 952. The departing passenger's departure card is collected in the collect departure card step 954, and the departing passenger's passport is scanned in the scan passport step 956. The passenger's departure is then recorded into the case database in the record departure step 958.

It can be appreciated that the import and export of trade will be processed in a manner similar to that of a passenger as described above and illustrated in FIGS. 8, 9A, and 9B. For example, upon entry of trade, a shipper will submit paperwork for review with a border management inspector, and provide any additional supporting information during the inspection.

The shipper's application or request will be reviewed along with the supporting paperwork and any case history available from the border management solution. A decision will also be processed allowing or denying a shipment, or referring the application or request for further processing. As with a traveler's or immigrant's application, all information collected during the process will be recorded into the case database of the border management solution.

Figure 10:
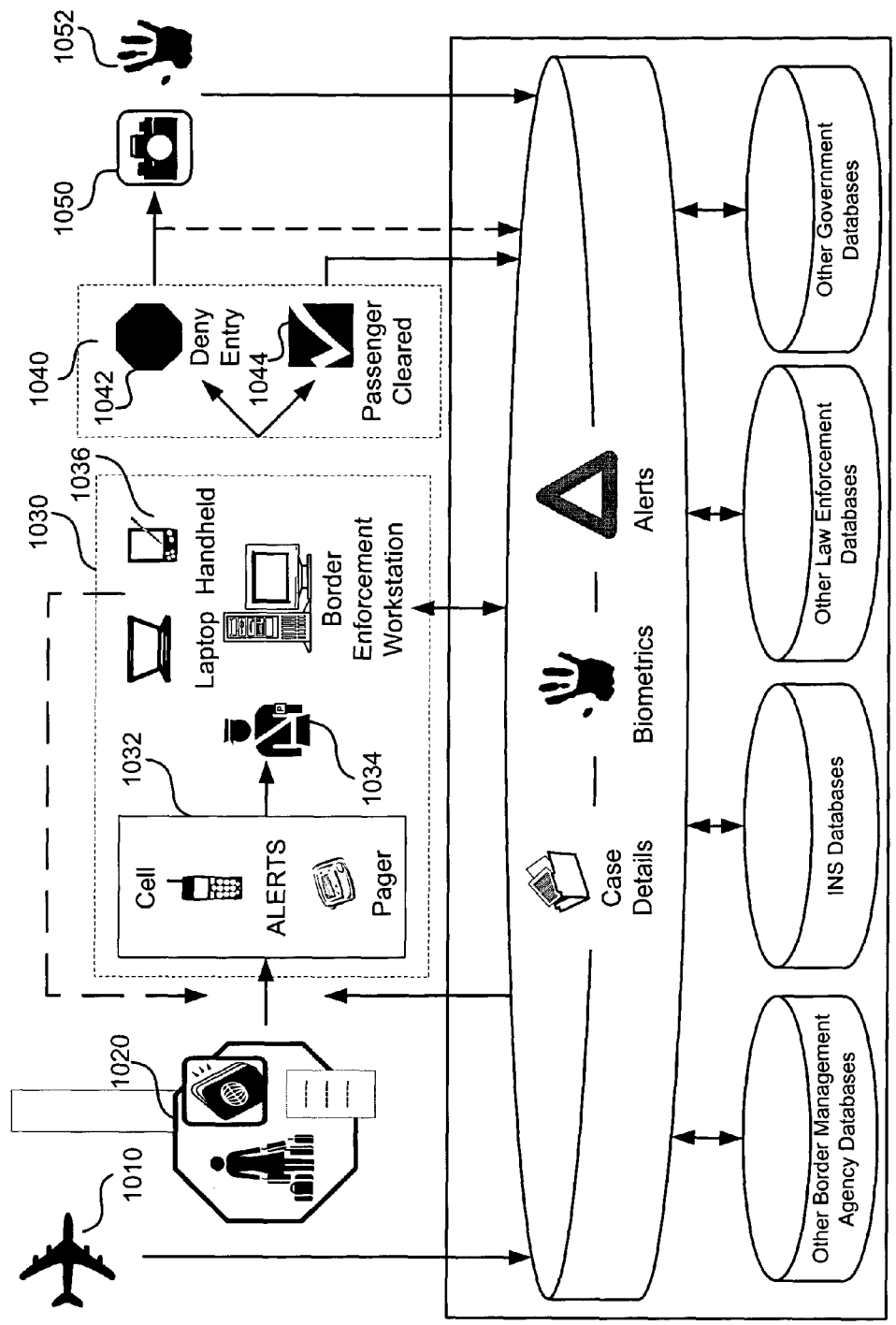
FIG. 10 illustrates an overview of the process flow through the detection and enforcement quadrant of the integrated border management solution, according to an embodiment of the present invention.

FIG. 10 illustrates an overview of the process flow through the detection and enforcement quadrant 530 of the integrated border management solution 50, as shown in FIG. 5, according to an embodiment of the present invention. During the process, information is collected and entered into the case database in a number of ways. In the example shown in FIG. 10, information is collected from an advance copy of a passenger manifest 1010 or from an arriving passenger's review and interview with an inspector 1020.

From this and other information, alerts and referrals may be generated, which in turn prompt an alert 1032. For example, matching a passenger's name, biometric data or other identifying information with an alert or watch list generates an alert or watch list trigger prompting an alert 1032. An inspector may also generate a referral for an investigation based on an entry interview, irregular documentation, or other suspicious behavior, which also prompts an alert 1032. Additionally, an enforcement officer 1034 investigating an alert may propagate an additional alert regarding a specific case to additional enforcement officers. In the event of a passenger match with an alert or watch list, an inspector's referral, or an officer's alert, the alert 1032 is propagated to enforcement officer 1034 via various communications devices, such as cell phones, pagers, or other computer and communication devices.

Based on the alert 1032, an officer 1034 may initiate an investigation using a computing device 1036, such as a laptop, handheld, or workstation connected with the case database. Using the border management system, the investigation may include reviewing case files, notes, and related cases, reviewing a passenger's documentation, or accessing other law enforcement applications. An enforcement officer 1034 may also initiate further fact-finding investigations, such as initiating additional interviews with passengers. As discussed above, the officer 1034 may also issue additional alerts 1032, if necessary.

Based on the officer's investigation and review, a decision 1040 allowing entry 1044 or denying entry 1042 may be made. The denial or clearance of a passenger is then recorded into the national case database.

When a passenger is denied entry 1042, a photograph 1050 is taken and biometric information 1052 is collected. The photograph 1050 and the biometric information 1052 are entered into the case database. The denied passenger's name may also be added to an alert or watch list within the case database.

Figure 11:
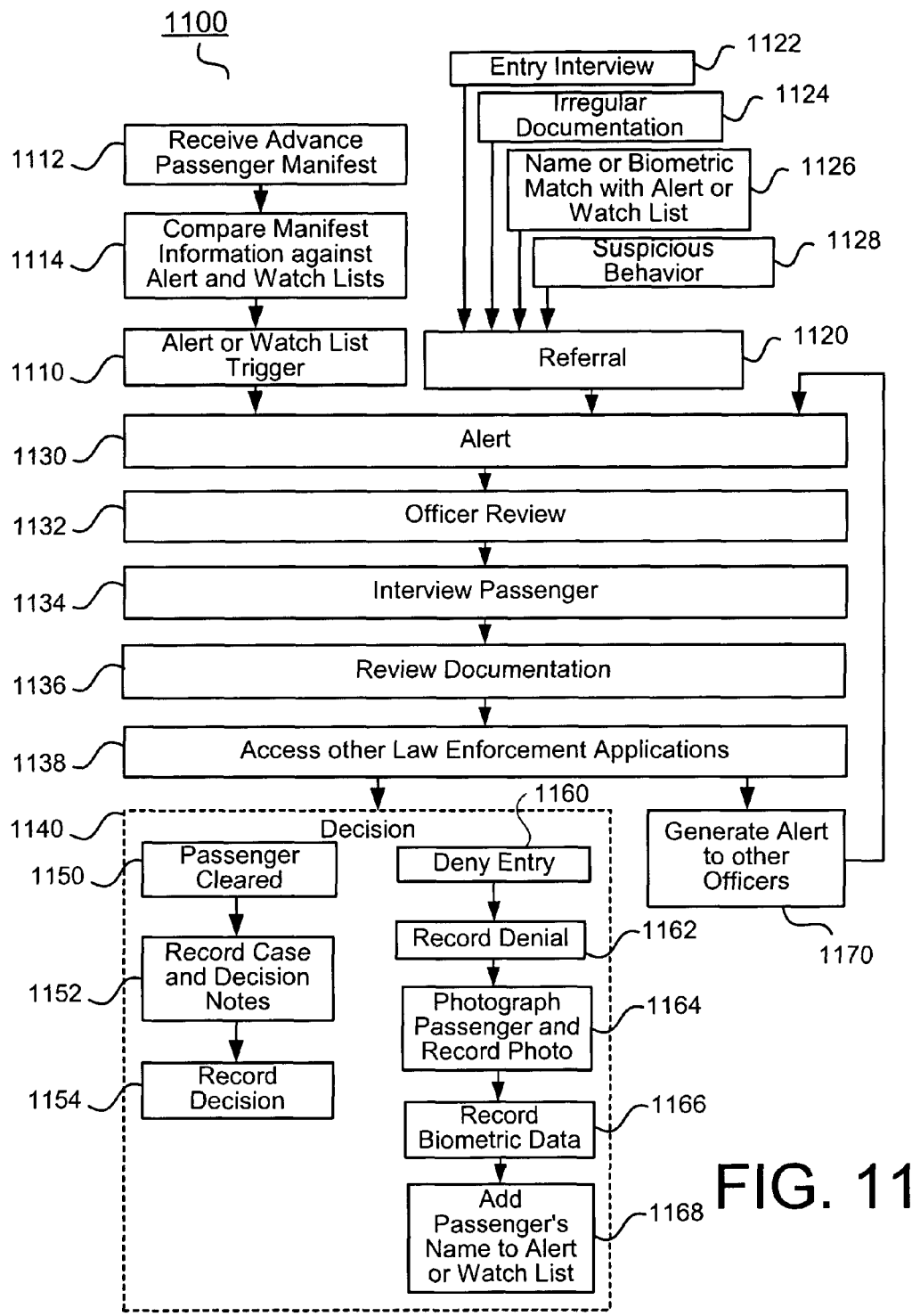
FIG. 11 illustrates a detailed view of the processing steps for generating an alert through the detection and enforcement quadrant of the integrated border management solution, according to an embodiment of the present invention.

FIG. 11 illustrates a detailed view of the processing steps alerting an officer of a passenger through the detection and enforcement quadrant 530 of the integrated border management solution 50, as shown in FIG. 5, according to an embodiment of the present invention. As illustrated in FIG. 11 an alert step 1130 notifies an officer or officers of a particular situation requiring investigation. An alert step 1130 may be generated from an alert or watch list trigger step 1110, a referral step 1120, or an officer's alert step 1170.

An alert or watch list trigger step 1110 may be generated when an advanced passenger manifest is received in the receive advance passenger manifest step 1112. The information contained in the advance manifest is compared against alert and watch lists maintained on the case database in the compare manifest step 1114. A match of the manifest information and an alert of watch list triggers and alert in the alert or watch list trigger step 1110. It can be appreciated that an advance passenger manifest is not the only type of information entered into the case database that will be compared to the alert and watch lists. In a further embodiment any information entered into the case database providing names or other identifying information may be able to generate an alert or watch list trigger.

A referral for an alert generated in the referral step 1120 may be based on information collected in a number of situations. For example, a referral may be generated by information collected in an entry interview in the entry interview step 1122, irregular documentation discovered in the irregular documentation step 1124, a name or biometric match with alter or watch lists in the name or biometric match step 1126, or when suspicious behavior is noticed in the suspicious behavior step 1128.

Once an alert is triggered in step 1130, an officer reviews case files, notes, and related cases in the officer review step 1132. Passengers may also be interviewed in the interview passenger step 1134. The officer may review the passenger's documentation in the review documentation step 1136. The officer my also access other law enforcement applications, for example a national crime information center ("NCIC"), for additional investigation in the access other law enforcement applications step 1138.

Upon investigating an alert step 1130, a decision may be reached in the decision step 1140. In the decision step 1140 a passenger may be cleared in the clear passenger step 1150, or the passenger may be denied entry in the deny entry step 1160. For a passenger that is cleared in the clear passenger step 1150, the case and any notes made during the investigation are recorded in the case database in the record case and decision notes step 1152. The decision to clear the passenger is also recorded in the case database in the record decision step 1154.

For a passenger that is denied entry in the deny entry step 1160, the denial is recorded in the record denial step 1162, a photograph of the passenger is taken and recorded in the case database in the record photo step 1164. In a further embodiment, a biometric signature is also recorded in the case database in the record biometric data step 1166. The passenger's name is also added to the appropriate alert or watch list in the add passenger's name step 1168.

In the event that additional assistance is needed, a officer may generate an additional alert to other officers in the generate alert step 1170. The generate alert step 1170 alerts additional enforcement officers of a particular situation and allows for additional assistance in an investigation.

It can be appreciated by those skilled in the art that the detection and enforcement of imported and exported trade will be processed in a manner similar to that of a traveler as described above and illustrated in FIGS. 10, and 11.

It can be appreciated that the detection and enforcement of trade will be processed in a manner similar to that of a passenger as described above and illustrated in FIGS. 10 and 11. For example, alerts and referrals are generated based upon information regarding a shipper or a specific shipment or package. An enforcement officer is alerted to a particular situation allowing for an investigation. An officer may generate a referral or make a decision on the status of a shipment based upon an investigation. As with a traveler, all information collected throughout the detection, investigation, and decision processes is recorded in the case database of the integrated border management solution.

Figure 12:
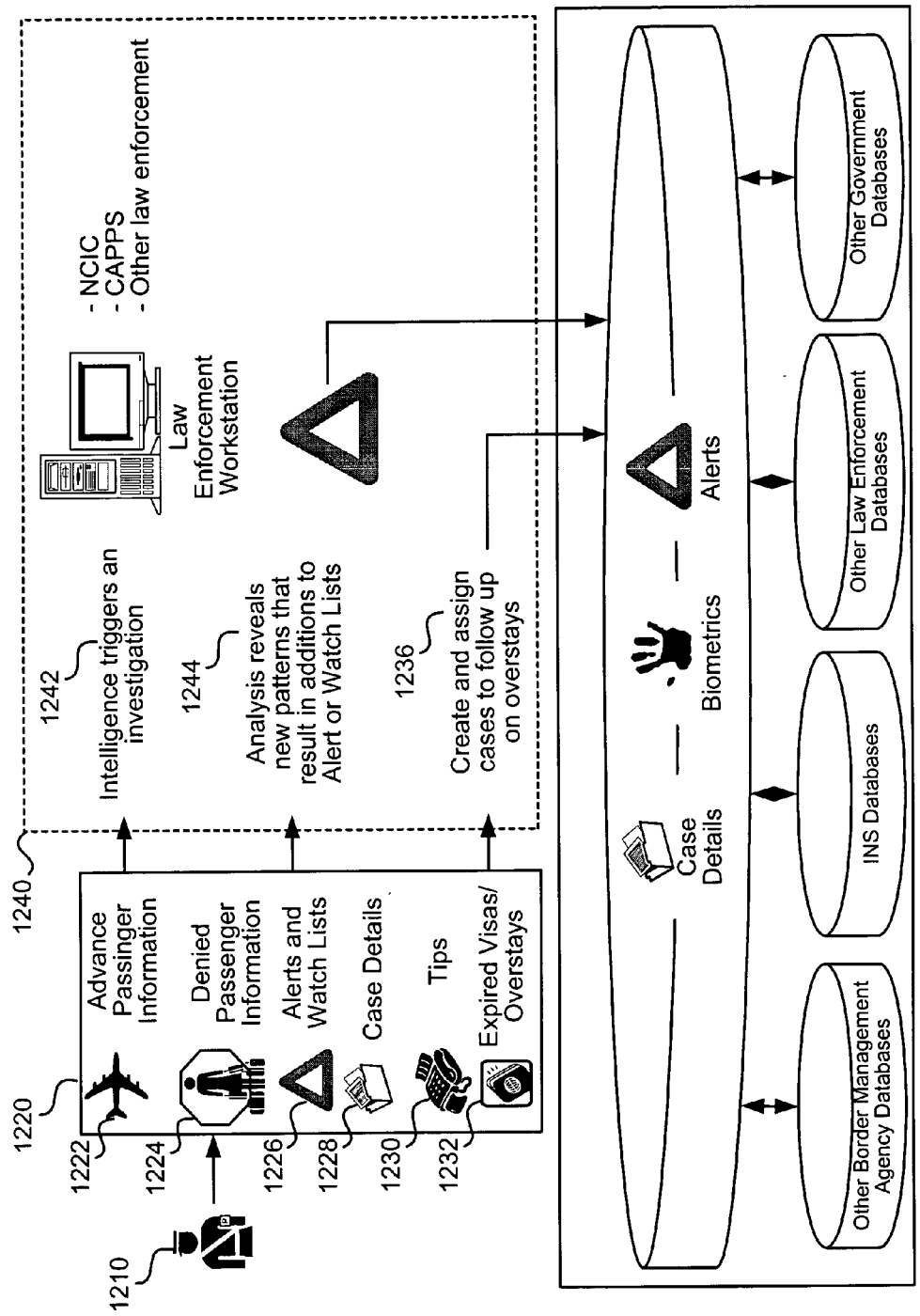
FIG. 12 illustrates an overview of the process flow through the investigation and intelligence quadrant of the integrated border management solution according to an embodiment of the present invention.

FIG. 12 illustrates an overview of the process flow of an investigation of a passenger through the investigation and intelligence quadrant 540 of the integrated border management solution 50, as shown in FIG. 5, according to the present invention. In this example, a border enforcement officer 1210 collects, reviews, and analyzes border intelligence. Border intelligence 1220 is developed by the collection and analysis of information maintained in the case database in combination with other internal or external databases. Border intelligence 1220 includes advance passenger information 1222, denied passenger information 1224, alerts and watch lists 1226, case patterns 1228, tips 1230, and expired visa and overstay information 1232.

Through intelligence analysis, border intelligence 1220 is generated that indicates that a certain action 1240 should be taken, such as an investigation 1242, a new pattern exists warranting additions to alert or watch lists 1244, or a new case should be created and assigned to follow up on overstays 1246. The information maintained on the national case database, as well as the intelligence generated by the border management solution, is accessible to border enforcement officials through various computing devices, such as law enforcement workstations, and mobile computing devices.

Figure 13:
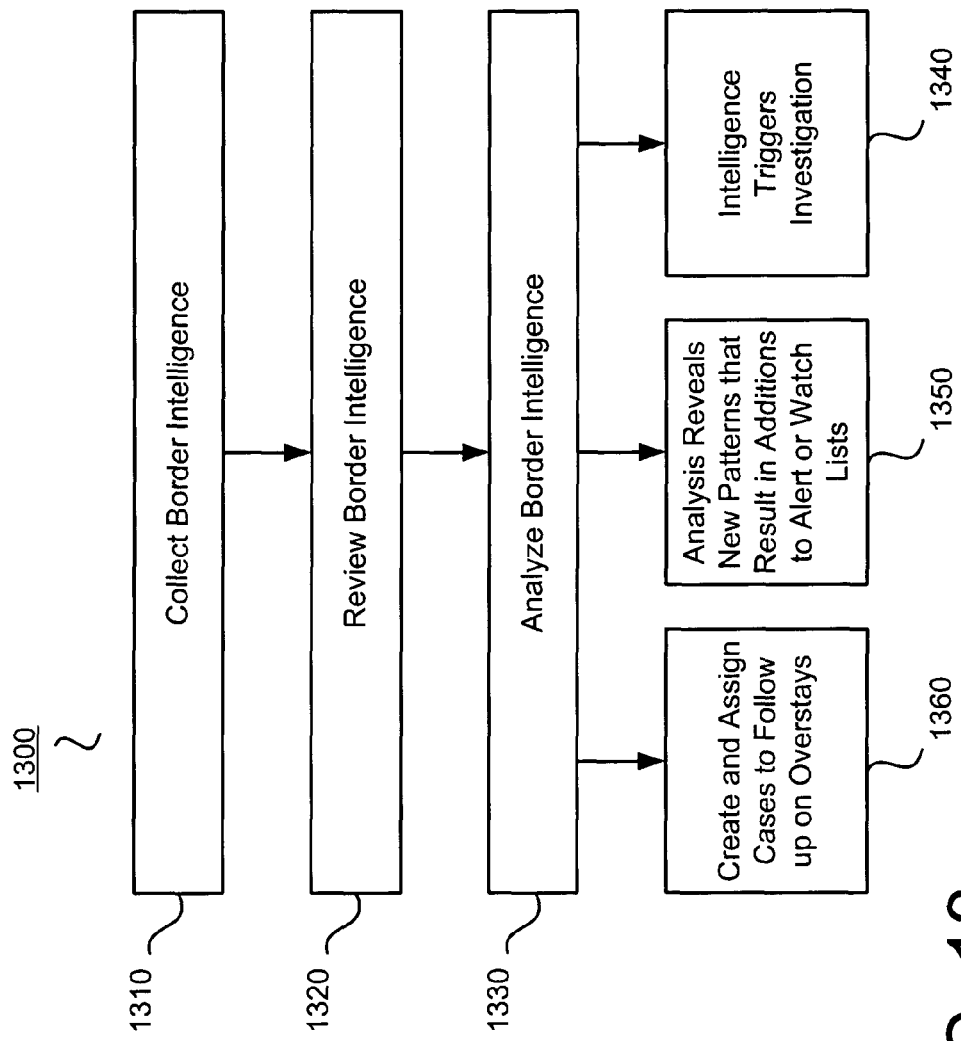
FIG. 13 illustrates a detailed view of the processing steps for an investigation through the investigation and intelligence quadrant of the integrated border management solution according to an embodiment of the present invention.

FIG. 13 illustrates an detailed view of the processing steps of using border intelligence through the investigation and intelligence quadrant 540 of the integrated border management solution 50, as shown in FIG. 5, according to the present invention. The process of using border intelligence step 1300 begins with the collection of border intelligence step 1310. Border intelligence is derived from various sources, including advance passenger information, denied passenger information, alerts and watch lists, case patterns, tips, and expired visas and overstays.

Once border intelligence is collected, an enforcement officer may review the border intelligence in the review border intelligence step 1320. The border intelligence may also be analyzed in the analyze border intelligence step 1330.

From the collection, review and analysis of border intelligence, steps 1310, 1320, and 1330, further investigation and intelligence may be developed. For example, intelligence may trigger an investigation step 1340. When an investigation is triggered, an enforcement officer may use NCIC, computer assisted passenger pre-screening ("CAPPS II"), or other law enforcement applications to help build additional information regarding a particular situation. The add to alert or watch lists step 1350 provides the ability to add names to an alert or watch list when border intelligence reveals new patterns of behavior. The create and assign cases step 1360 provides the ability for an enforcement officer to use border intelligence to create and assign cases for those travelers with expired visas or overstays.

It can be appreciated by those skilled in the art that the investigation and intelligence of imported and exported trade will be processed in a manner similar to that of a traveler as described above and illustrated in FIGS. 12, and 13.

It can be appreciated that the investigation and intelligence of trade will be processed in a manner similar to that of a passenger as described above and illustrated in FIGS. 12 and 13. For example, intelligence regarding a shipper or a specific shipment or package is collected and monitored. Intelligence will trigger investigations, additions to alert or watch lists, and follow-up inquiries for other specific situations. An investigating officer will have access to data maintained on the case database of the integrated border management solution, as well as other law enforcement data and applications. All information developed regarding a shipper, a shipment, or a particular package will be added to information maintained on the case database.

Figure 14:
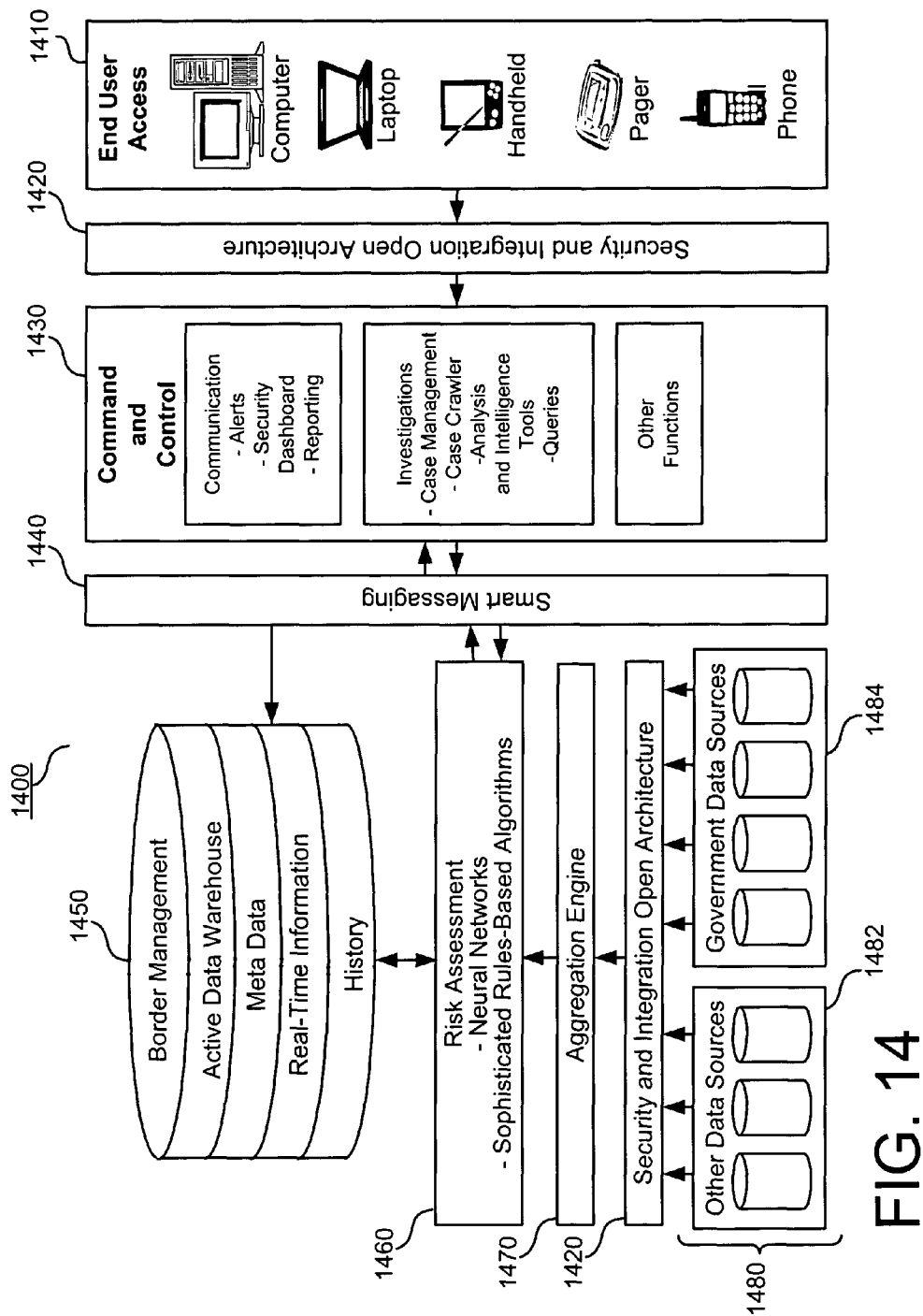
FIG. 14 shows the intelligence infrastructure for collecting and analyzing border enforcement data according to an embodiment of the present invention.

FIG. 14 shows the intelligence infrastructure 1400 used for collecting and analyzing border enforcement data according to an embodiment of the present invention. The intelligence infrastructure includes an end user access device 1410, a security and integration open architecture layer 1420, a command and control element 1430, a smart messaging element 1440 a border management data store 1450, a risk assessment element 1460, an aggregation engine 1470, and additional data sources 1480.

A border enforcement officer obtains information and intelligence through the intelligence infrastructure 1400 using an end user access device 1410. An end user access device 1410 may include any computing or communications device. For example, a desktop or laptop computer, or a mobile device, such as a handheld computer, a pager, or a cell phone.

A security and integration open architecture layer 1420 provides security for the intelligence infrastructure 1400. The security and integration open architecture 1420 is positioned between and provides the communication path for the internal system and any external devices used in the intelligence infrastructure, such as the end user access devices 1410 and external data sources 1480. Through this communication path access to the applications and data maintained on the intelligence infrastructure 1400 is monitored.

The command and control layer 1430 allows interaction with the applications providing information maintained in or accessible from the border management solution. In one embodiment, applications are available for communication 1432, investigations 1434, and other functions 1436. The communications applications 1432 may include alerts, security dashboard output, and reporting. The investigations applications 1434 may include case management, case crawler, analysis and intelligence tools, and queries. The investigation applications 1434 are also interconnected with the smart messaging layer 1440.

The smart message layer 1440 provides specified information and format to the interactions with the intelligence data. In one embodiment of the present invention, the smart messaging layer 1440 accesses and interacts with the border management data store 1450 and the risk assessment functionality 1460.

The border management data store 1450 includes various layers of information used within the intelligence infrastructure 1400. According to an embodiment of the present invention, data maintained on the border management data store 1450 includes the border management active data warehouse 1452, meta data 1454, real-time information 1456, and historical data 1458. The border management data store 1450 is also accessible from the risk assessment element 1460.

The risk assessment element 1460 generates intelligence regarding a specific case or situation. Risk assessment applies neural networks and rules-based algorithms to data collected from the border management data store 1450 and from the additional data sources 1480, including government data sources 1482 and non-government data sources 1484. The risk assessment element 1460 generates knowledge and intelligence from the collected information and reports that knowledge and intelligence to the end user 1410 and updates the border management data store 1460 with any new information.

Before the information collected from the additional data sources is used by the risk assessment element 1460 if first passes through the security and integration open architecture 1420, as discussed above, as well as through the aggregation engine 1470. The aggregation engine 1470 synthesizes the information from the multiple data sources into a coherent collection of information.

It will be apparent to those skilled in the art that various modifications and variations can be made in the present invention without departing from the spirit or scope of the invention. Thus, it is intended that the present invention cover the modifications and variations of this invention provided that they come within the scope of any claims and their equivalents.

The invention claimed is:

1. A computer-based system for implementing a border management application architecture comprising:
   at least one processor;
   at least one computerized database storing border management data; and
   at least one computer-readable medium encoding instructions for implementing a border management application architecture, wherein said instructions include:
   providing a set of core applications for standard border management functions in a shared applications architecture, wherein the set of core applications includes a process imports application, a process exports application, one or more investigation applications, an entry processing application, an exit processing application, and a form submission and processing application;
   providing a customer channel interface for interconnecting a set of customer channels that provide individual access points for a plurality of users of the border management application architecture and the set of core applications;
   providing one or more management access interfaces for interconnecting one or more management access channels with the set of core applications to thereby provide access points and tools for the sharing and access of border management data among the set of core applications; and
   providing an enforcement database storing case data and individual data;
   wherein the set of core applications further comprise a set of case management applications, wherein the set of case management applications further comprise a set of intelligence applications used to transform the border management data into intelligence using the shared border management data and the case data and the individual data stored in the enforcement database.

2. The computer-based system for implementing a border management application architecture of claim 1, wherein the one or more management access channels further comprise:
   an information and knowledge management tool set for providing access points and tools for sharing and access of border management data;
   a management and administration tool set for providing management and administration functions; and
   a client relationship management tool set allowing customer assistance.

3. The computer-based system for implementing a border management application architecture of claim 1, wherein the intelligence includes advance passenger information, denied passenger information, alerts, watch lists, case patterns, tips, expired visa and overstay information, investigation initiations, and alert list additions.

4. The computer-based system for implementing a border management application architecture of claim 1, wherein the intelligence applications communicate the intelligence to a communication device of an officer.

5. The computer-based system for implementing a border management application architecture of claim 1, wherein the instructions further include providing a shared security and integration open architecture between the customer channel interface and the set of core applications, the shared security and integration open architecture monitoring access to the core applications.

6. A computer-readable medium encoding instructions for implementing a border management application architecture, wherein said instructions include:
   providing a set of core applications for standard border management functions in a shared applications architecture, wherein the set of core applications includes a process imports application, a process exports application, one or more investigation applications, an entry processing application, an exit processing application, and a form submission and processing application;
   providing a customer channel interface for interconnecting a set of customer channels that provide individual access points for a plurality of users of the border management application architecture and the set of core applications;
   providing one or more management access interfaces for interconnecting one or more management access channels with the set of core applications to thereby provide access points and tools for the sharing and access of border management data among the set of core applications;
   providing an enforcement database storing case data and individual data; and
   wherein the set of core applications further comprise a set of case management applications, wherein the set of case management applications further comprise a set of intelligence applications used to transform the border management data into intelligence using the shared border management data and the case data and the individual data stored in the enforcement database.

7. The computer-readable medium of claim 6, wherein the intelligence includes advance passenger information, denied passenger information, alerts, watch lists, case patterns, tips, expired visa and overstay information, investigation initiations, and alert list additions.

8. The computer-readable medium of claim 6, wherein the intelligence applications communicate the intelligence to a communication device of an officer.

9. The computer-readable medium of claim 6, wherein the instructions further include providing a shared security and integration open architecture between the customer channel interface and the set of core applications, the shared security and integration open architecture monitoring access to the core applications.

* * * * *